CASPER DITTMAN
*Assignor to Him-self and to*
G. B. SWOPE.
*Improved Keel-handled Hay Cutter.*
No. 105050     Patented Jul 5 1870
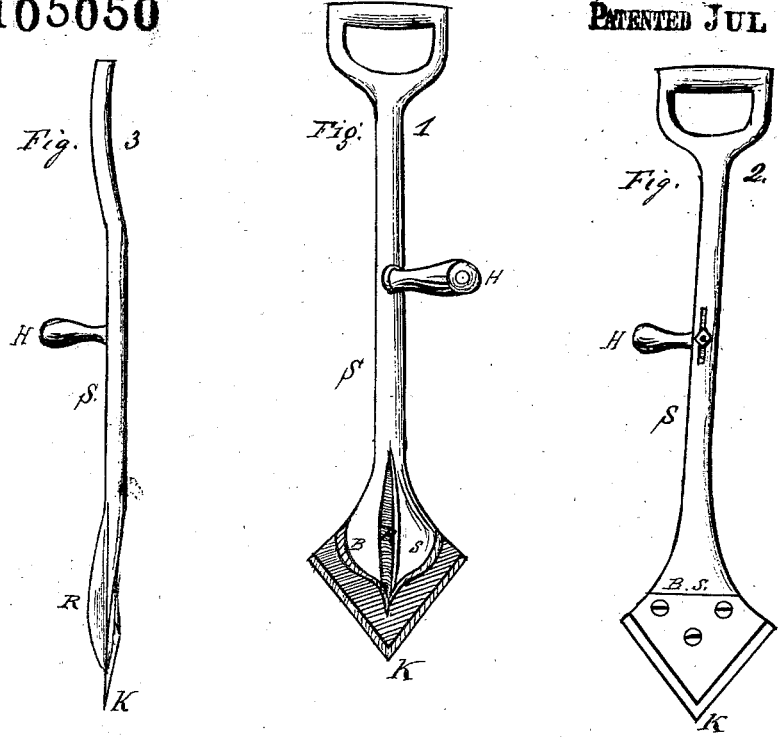
Witnesses,—
Wm B. Wiley
Jacob Stauffer
Inventor.
Casper Dittman

United States Patent Office.

CASPER DITTMAN, OF UPPER LEACOCK TOWNSHIP, PENNSYLVANIA, ASSIGNOR TO HIMSELF AND GRAYBILL B. SWOPE, OF SAME PLACE.

Letters Patent No. 105,050, dated July 5, 1870.

IMPROVEMENT IN HAY-KNIVES.

The Schedule referred to in these Letters Patent and making part of the same

I, CASPER DITTMAN, of Upper Leacock township, in the county of Lancaster and State of Pennsylvania, have invented certain Improvements in Handles for Knives to Cut Hay and Straw, or the like, of which the following is a specification.

The nature of my improvement consists in casting the stem or handle of the cutter with a keel or guide centrally with the point of the knife or cutter, in order to facilitate the use of the knife, and deliver each successive cut in the same line of direction, thereby preventing a sideling thrust, so readily made without such a guide or keel to the stem or handle.

Figure 1 shows the general construction of the stem and holder, with the central keel or guide.

Figure 2, the reverse side of the same.

Figure 3, a profile view of the implement.

The two-edged knife, K, ground bevel on both sides of the double cutting-edge, forming an angle less than a right angle, say of seventy-eight to eighty degrees, is secured to the shaft or stem, S, by screws, countersunk, or rivets, flush with the upper face of the widened base, S B, of the stem or handle, S, the upper end being provided with an open holder, spade-handle like, or a simple cross-piece.

The lower stem-holder, H, may be made adjustable by a slot in the stem and binding-screw.

The flattened and widened base B S of the knife-holder or stem is centrally keeled.

The keel or guide ridge, R, sharply formed and curved at the ends and sides, to give the least amount of resistance in penetrating the hay or material to be cut, is found, by actual trial, to facilitate the cutting in a very marked degree, by continuing or guiding each successive cut in the same line of direction, which it is very difficult to do by the use of the ordinary stems to angular-rounded or wedge-shaped knives.

Without such a guide much muscular force is expended without producing the same results, by the tendency to thrust more less obliquely, or deviating from the preceding cut. This tendency is prevented by the use of the keel, and the cutting greatly facilitated.

I am aware that two-edged, wedge-form, or rounded, ovate, and pointed blades are used with handles and holders for the hands, of a similar construction; but I am not aware that keeled stems or handles, made as shown and described, were ever before known or used for hay-cutting knives.

What I claim as my invention, and desire to secure by Letters Patent, is—

The formation of the widened base B S of the stem with its central keel or guide-ridge R, in combination with the cutting-blade K, arranged and constructed in the manner and for the purpose specified.

CASPER DITTMAN.

Witnesses:
WM. B. WILEY,
JACOB STAUFFER.